(12) United States Patent
Tate et al.

(10) Patent No.: US 6,943,306 B2
(45) Date of Patent: Sep. 13, 2005

(54) INTERLOCK MECHANISMS

(75) Inventors: Clare Tate, Newton Aycliffe (GB); John Sadler, Darlington (GB)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/755,133

(22) Filed: Jan. 9, 2004

(65) Prior Publication Data

US 2004/0188230 A1 Sep. 30, 2004

(30) Foreign Application Priority Data

Dec. 19, 2002 (GB) ............................................. 0229517
Jan. 9, 2003 (GB) ............................................. 0300442

(51) Int. Cl.[7] ................................................ H01H 9/28
(52) U.S. Cl. ................................. 200/43.17; 200/43.18
(58) Field of Search .......................... 200/43.01–43.21, 200/522, 318, 321, 332.2, 318.2, 6 A, 6 R, 50, 29, 170, 173, 322.2; 310/6 A, 6 R, 50; 173/29, 170, 173

(56) References Cited

U.S. PATENT DOCUMENTS

| | | | | |
|---|---|---|---|---|
| 4,617,578 A | * | 10/1986 | Nezu et al. ................... | 347/239 |
| 5,243,732 A | * | 9/1993 | Koharagi et al. .............. | 15/319 |
| 5,316,382 A | * | 5/1994 | Penaranda et al. ........... | 366/129 |
| 5,792,139 A | * | 8/1998 | Chambers et al. ............ | 606/41 |
| 6,142,715 A | * | 11/2000 | Fontaine ..................... | 407/29.1 |
| 6,259,047 B1 | * | 7/2001 | Kimata et al. ............ | 200/43.17 |
| 6,469,269 B1 | * | 10/2002 | Jong ........................... | 200/522 |
| 6,577,214 B1 | * | 6/2003 | DeGrazia et al. .............. | 335/68 |
| 6,585,458 B1 | * | 7/2003 | Fontaine ..................... | 407/29.1 |
| 6,768,234 B2 | * | 7/2004 | Aoki ......................... | 310/68 A |
| 6,823,134 B2 | * | 11/2004 | Glasgow et al. ......... | 200/42.01 |

* cited by examiner

Primary Examiner—Elvin Enad
Assistant Examiner—Lisa Klaus
(74) Attorney, Agent, or Firm—Wesley W. Muller; Bruce S. Shapiro; Johnathon Yun (57) ABSTRACT

The present invention provides an interlock mechanism suitable for use with a blower-vacuum device, which comprises: a user-operable switch (30) having a first condition for activating a motor of said blower-vacuum device and a second condition for deactivating said motor; a latch (58) for engagement with a removable attachment of said blower-vacuum device; and a user-operable release button (57) for disengaging said attachment from said latch (58); wherein said switch (30) is operable to activate said motor only when an attachment is engaged with said latch (58), and said release button (57) is operable to disengage an attachment from said latch (58) only when said motor is deactivated; and wherein the first condition of said switch (30) comprises a first position of said switch for activating said motor at a first speed of operation and a second position of said switch for activating said motor at a second speed of operation. Thus the fan of the blowervac can be driven by the motor at two different speeds of operation suitable for different usage conditions, even though the fan cannot be driven by the motor when the fan is exposed.

15 Claims, 10 Drawing Sheets

INTERLOCK MECHANISMS

The present invention concerns interlock mechanisms and in particular, interlock mechanisms appropriate for use with blower-vacuum devices. Blower-vacuum devices, commonly referred to as blowervacs, are typically used for collecting garden waste, such as leaves, grass cuttings and twigs.

Blowervacs generally comprise a motor having an output shaft connected to a fan. The motor is usually either petrol or electrically powered. The fan is enclosed within a chamber called a volute and is configured to draw air in along its axis of rotation and expel air out tangentially when the fan is driven by the motor. Fans having such a configuration are properly called impellers. The interior of the volute is shaped to enable the flow of air generated by the fan in operation. Accordingly, the volute is in essence disc-shaped and is provided with both an inlet generally aligned with the impeller's axis of rotation and at least one outlet located at a point on the periphery of the volute.

As their name implies, blowervacs have two modes of operation: blowing and vacuuming. In the blowing mode of operation, clean air is drawn into the volute from the atmosphere via the inlet thereto and is expelled via the outlet. A blower tube is attached to the outlet in order to concentrate and direct the expelled air into a jet, which may be aimed in different directions by pointing the blower tube as desired. In the vacuuming mode of operation, garden waste may be collected up a vacuum tube connected to the blowervac in one of two ways, usually known as clean fan and dirty fan operation. In clean fan operation of a blowervac in vacuuming mode, clean air is drawn into the volute from the atmosphere via the inlet thereto in the same manner as for blowing operation and the air expelled from the volute through the outlet thereof is directed towards a collection device or receptacle. The receptacle is porous to the passage of air therethrough and is also fed by the vacuum tube with air from ground level. Air passing into the receptacle from the volute therefore causes air to be sucked up the vacuum tube as well. Garden waste entrained with the air passing up the vacuum tube is collected in the receptacle without passing through the fan; hence, clean fan operation. In contrast, in dirty fan operation, an air-porous receptacle for garden waste is attached directly to the outlet from the volute and the vacuum tube is instead attached to the inlet thereto. In this latter case, garden waste entrained with air passing up the vacuum tube enters the volute via the inlet thereto and collides with the fan, before being expelled via the outlet of the volute into the receptacle; hence, dirty fan operation. Collision of the garden waste with the fan causes the fan to mulch the garden waste into smaller particles. Since garden waste mulched in this fashion contains far fewer air pockets than unmulched garden waste, the volume ratio of unmulched to mulched garden waste can be as much as 10:1. Dirty fan operation is therefore generally preferable to clean fan operation of a blowervac in vacuuming mode because the garden waste receptacle can store a much larger mass of garden waste in the same volume once it has been mulched than of unmulched waste.

An example of a blowervac providing dirty fan operation in the vacuuming mode thereof is described in European Patent No. 0 723 758 of Black & Decker Inc. FIG. 1 of European Patent No. 0 723 758 shows the blowervac thereof in the blowing mode of operation and FIG. 2 of this patent document shows the blowervac thereof in the vacuuming mode of operation with a dirty fan. FIG. 3 of this patent document shows an embodiment of the blowervac thereof convertible between a blowing mode of operation and a vacuuming mode of operation with a dirty fan. As may be seen from these three figures, the blowervac is provided with one or more different detachable volutes for use in the blowing and vacuuming modes of operation. In all cases, however, since the volute may be removed from around the fan, access to the fan is simple and both the fan and the volute can be cleaned with ease if they become clogged during use of the blowervac in the vacuuming mode of operation.

However, the advantages provided by having easy access to the fan of a blowervac also carry with them an attendant risk for the safety of the blowervac's users, namely that a user might be injured by operation of the fan when the fan is exposed. This risk must be taken very seriously because, as already mentioned above, in dirty fan operation, the fan is designed to mulch garden waste which may include twigs, and therefore can easily sever a user's finger if the finger is inserted into the fan when the fan is being driven by the motor. Accordingly, it is highly desirable to provide blowervacs of the type which have fans that can be exposed with an interlock mechanism to prevent operation of the fan by the motor when the fan is exposed.

A number of different examples of such an interlock mechanism are described in European Patent No. 0 723 759 of Black & Decker Inc.. Although the interlock mechanisms described in this patent document are generally excellent and highly effective at preventing operation of the fan by the motor when the fan is exposed, they are all specifically adapted for use in a blowervac in which the fan has only a single speed of operation and the power switch for activation of the motor by a user consequently has only two operational conditions, corresponding to "power on" and "power off" for the motor. However, it would be highly desirable to have a blowervac in which the fan has two different speeds of operation—a low speed and a high speed—each suitable for different usage conditions, but without losing the safety benefits provided by also having an interlock mechanism which prevents operation of the fan by the motor when the fan is exposed. None of the interlock mechanisms described in European Patent No. 0 723 759 can readily be adapted to meet this desire.

The present invention addresses this problem. Accordingly, the present invention provides an interlock mechanism suitable for use with a blower-vacuum device, which comprises: a user-operable switch having a first condition for activating a motor of said blower-vacuum device and a second condition for deactivating said motor; a latch for engagement with a removable attachment of said blower-vacuum device; and a user-operable release button for disengaging said attachment from said latch; wherein said switch is operable to activate said motor only when an attachment is engaged with said latch, and said release button is operable to disengage an attachment from said latch only when said motor is deactivated; and wherein the first condition of the switch comprises a first position of said switch for activating said motor at a first speed of operation and a second position of said switch for activating said motor at a second speed of operation.

Since the interlock mechanism of the invention comprises a first position of the switch for activating the motor at a first speed of operation and a second position of the switch for activating the motor at a second speed of operation, the switch for activation of the motor by a user consequently has three operational conditions, corresponding to "speed 1", "speed 2" and "power off" for the motor. Thus the fan of the blowervac can be driven by the motor at two different speeds of operation suitable for different usage conditions, as desired, even though the fan cannot be driven by the motor when the fan is exposed.

This and other features and advantages of the present invention will be better understood from the following detailed description, which is given by way of example and with reference to the accompanying drawings, in which.

Figure 1:
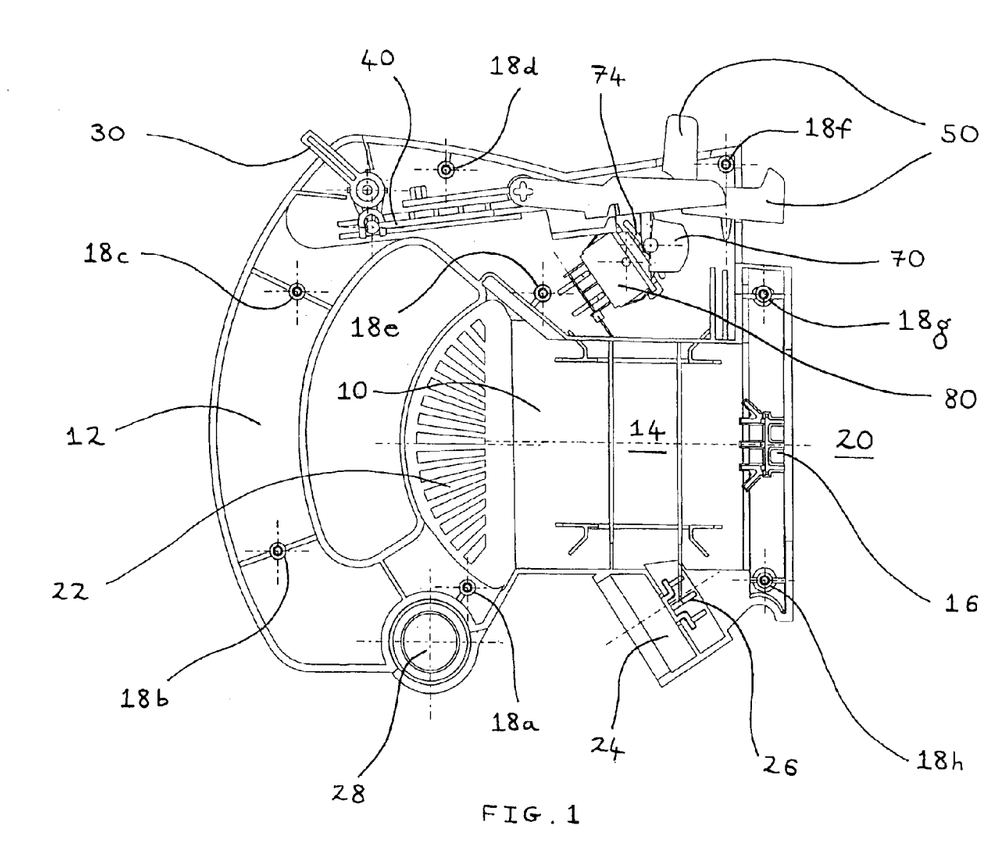
FIG. 1 is a side view of an interlock mechanism according to the invention in a first state of operation.

Referring firstly to FIG. 1, there is shown a side view of an interlock mechanism according to the invention housed in one half of a motor housing 10 of a blowervac. Motor housing 10 has a so-called "clamshell" construction, according to which two plastic mouldings comprising left and right halves of motor housing 10 are joined together in a vertical plane parallel with the longitudinal axis of the blowervac at fixing points 18a, 18b, 18c, 18d, 18e, 18f, 18g and 18h by means of screws. Such a clamshell construction is typical of many power tools, including blowervacs. In FIG. 1, one of the plastic mouldings of the motor housing (in this case, the moulding forming the right half of the clamshell) has been removed, in order to reveal the interior of motor housing 10, including the interlock mechanism.

Motor housing 10 comprises a handle 12, a cavity 14 for receiving a motor, and an exit port 16 where a drive shaft of the motor may protrude exterior of motor housing 10 for attachment of a fan to the drive shaft in the region indicated by reference numeral 20. Motor housing 10 is also provided with a series of air vents 22 integrally moulded therewith, in order to prevent the motor from overheating. Motor housing 10 further comprises an inlet port 24 containing an electrical power socket 26 for supplying electrical power to the motor and a cable retention mechanism 28 (not fully shown in FIG. 1, but evident from all of FIGS. 2 to 5). Cable retention mechanism 28 is biassed in the direction indicated by arrow A in FIG. 2, to ensure that if a plug of an electrical power cable is inserted into inlet port 24, it remains securely connected with the electrical power socket 26 until such time as a user wishes to remove it therefrom.

The interlock mechanism contained within motor housing 10 comprises a three-position switch 30, a slider component 40, a release button and latch component 50, and an actuator 70. Actuator 70 is adapted to engage with a three-position electrical relay switch 80, which in turn is wired to both the motor and the electrical power socket 26 in such a way as to provide for low-speed and high-speed operation of the motor, as well as a power-off state of the motor, according to the position of the relay switch. (No electrical wires are shown in the drawings for the sake of clarity.) The construction and operation of the interlock mechanism will now be described in greater detail.

Figure 2:
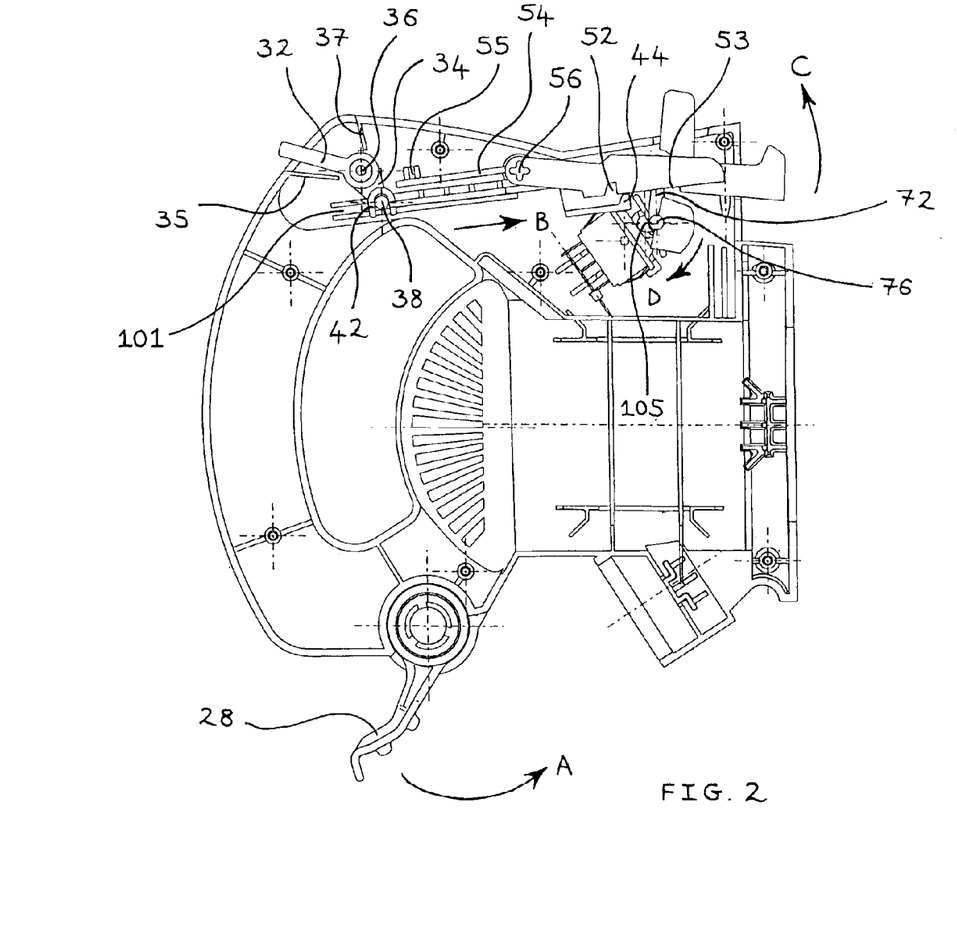
FIG. 2 is a side view of the interlock mechanism of FIG. 1 in a second state of operation.

Referring firstly to FIG. 2, it may be seen that switch 30 comprises a lever 32 and an arm 34 in rigid connection therewith, both of which are rotatable in the plane of the drawing about an axis 36 by operation of lever 32 by a user (see also FIGS. 9A to 9E for more detailed views of switch 30). The extent by which lever 32 may be rotated about axis 36 is limited by detents 35 and 37 formed integrally with motor housing 10. Referring back to FIG. 1, the interlock mechanism is shown in a first state of operation, in which switch 30 is in a first position, designated the "off" position, with lever 32 located centrally between the limits provided by detents 35 and 37, and no attachment is engaged with motor housing 10. In this first state of operation, the position of relay switch 80 also ensures that the motor is off. Although switch 30 can be operated by a user from the "off" position shown in FIG. 1 into the position of lever 32 shown in FIG. 2 or in the opposite direction into the position of lever 32 shown in FIG. 5, this motion is not transmitted to relay switch 80 by the interlock mechanism, and both relay switch 80 and the motor consequently remain in a power-off state. This is for the following reasons.

Figure 8A:
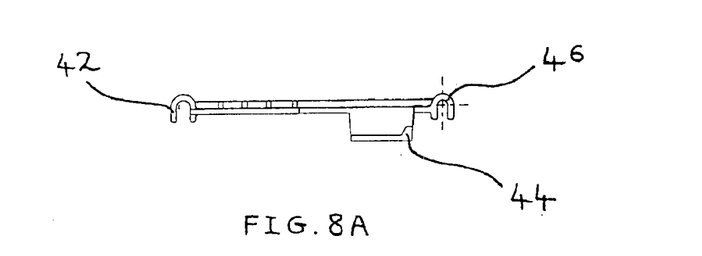
FIGS. 8A, 8B, 8C, 8D, 8E and 8F are respectively right-side elevational, top plan, bottom plan, left-side elevational, rear elevational and front elevational views of a slider component of the interlock mechanism shown in FIGS. 1 to 6.
Figure 8B:
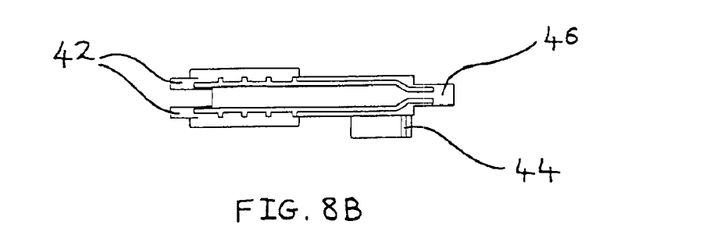
Figures 8C, 8E:
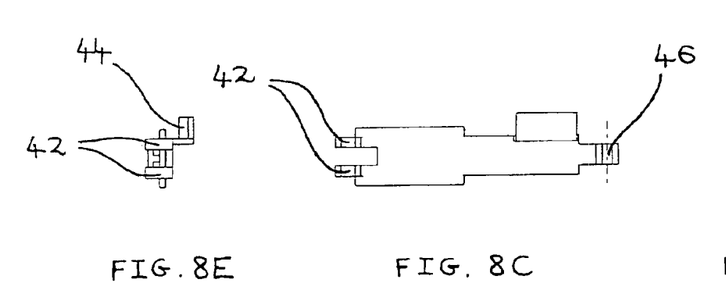
Figure 8D:
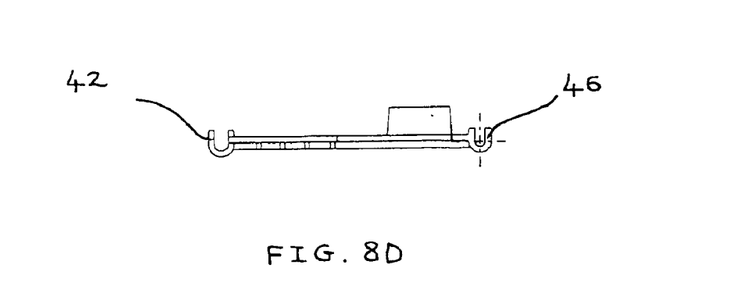
Figure 8F:
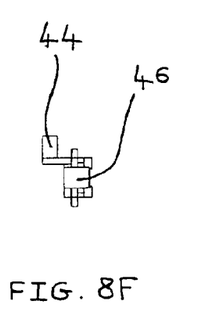
Figure 9A:
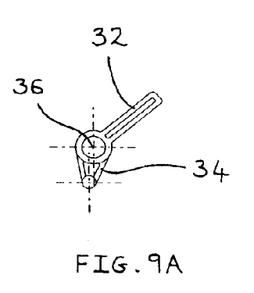
FIGS. 9A, 9B, 9C, 9D and 9E are respectively left-side elevational, top plan, bottom plan, front elevational and rear elevational views of a power switch component of the interlock mechanism shown in FIGS. 1 to 6.
Figure 9B:
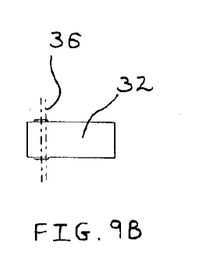
Figure 9C:
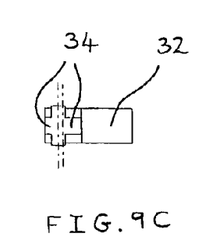
Figure 9D:
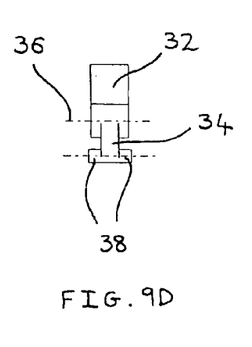
Figure 9E:
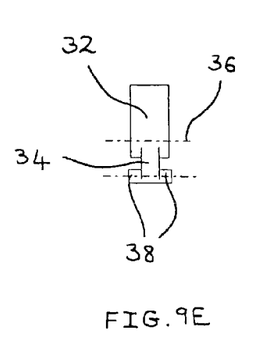
Figure 10A:
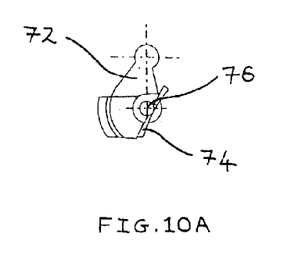
FIGS. 10A, 10B, 10C, 10D and 10E are respectively left-side elevational, top plan, bottom plan, front elevational and rear elevational views of an actuator of the interlock mechanism shown in FIGS. 1 to 6.
Figure 10B:
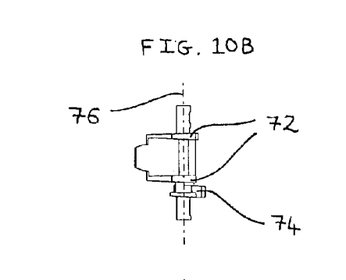
Figure 10C:
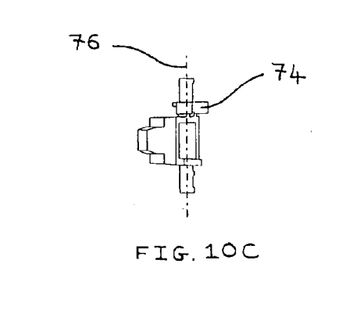
Figure 10D:
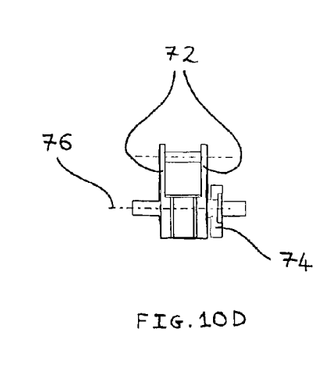
Figure 10E:
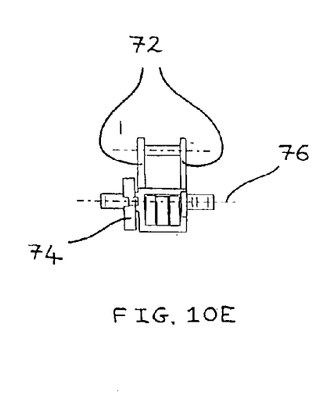

Referring to FIG. 2, it may be seen that rotation of lever 32 by a user from the position shown in FIG. 1 to that shown in FIG. 2 causes slider 40 to move in the direction indicated by arrow B. This is because arm 34 of switch 30 is provided with two side branches 38 which engage with a hook 42 of slider 40. As may be seen from FIGS. 8B and 8C, hook 42 is split into two halves to accommodate arm 34. Slider 40 is free to slide in channel 101 formed integrally with motor housing 10. Rotation of lever 32 by a user from the position shown in FIG. 1 in the opposite direction into the position shown in FIG. 5 would cause slider 40 to move in a direction opposite to that indicated by arrow B instead. The far end of slider 40 from hook 42 is provided with a further hook 46, part of which may be seen in FIG. 3 and which is more readily visible in the cross-sectional view of FIG. 6, as well as in FIGS. 8A and 8D. Hook 46 engages with an arm 72 of actuator 70. As may be seen from FIGS. 10D and 10E, arm 72 is split into two halves to accommodate hook 46. When slider 40 moves in the direction indicated by arrow B, actuator 70 therefore rotates in the plane of the drawing about an axis 76 and in the direction indicated in FIG. 2 by arrow D. However, actuator 70 fails to operate relay switch 80 because the rotation of actuator 70 in the direction of arrow D when actuator 70 is located in the position shown in FIG. 2 does not bring actuator 70 close enough to relay switch 80 to operate it. Thus when no attachment is engaged with motor housing 10 and the fan is consequently exposed to a user, the motor remains off even if switch 30 is operated by a user from the "off" position shown in FIG. 1 into the "on" position shown in FIG. 2. The same applies if switch 30 is instead operated by a user from the "off" position shown in FIG. 1 in the opposite direction into the alternative "on" position shown in FIG. 5. In this case, hook 46 of slider 40 causes actuator 70 to rotate about axis 76 in a direction opposite to that indicated in FIG. 2 by arrow D, but actuator 70 again fails to come close enough to relay switch 80 in order to operate it. This ensures that in both cases, a user cannot be injured by operation of the fan when the fan is exposed.

As may also be seen from FIG. 2, slider 40 is further provided with a tooth 44 designed to engage with a notch 52 of release button and latch component 50 of the interlock mechanism. However, in the first state of operation shown in FIG. 1 and the second state of operation shown in FIG. 2, the motion imparted to slider 40 by operation of switch 30 by a user does not cause tooth 44 to engage with notch 52. Instead, tooth 44 just slides along edge 53 of release button and latch component 50. This is due to the construction and arrangement of release button and latch component 50, which are as follows.

As may be seen from FIG. 2, release button and latch component 50 comprises an arm 54 in rigid connection therewith, having a protrusion 55 formed on the end thereof. Release button and latch component 50 is free to rotate in the plane of the drawing about an axis 56, but protrusion 55 is engaged with one end of a compression spring (not shown in the drawings), which is held in a partially compressed state between arm 54 of release button and latch component 50 and an outer wall of motor housing 10. Consequently, release button and latch component 50 is biassed by this compression spring in the direction indicated in FIG. 2 by arrow C and notch 52 is held clear of tooth 44.

Figure 3:
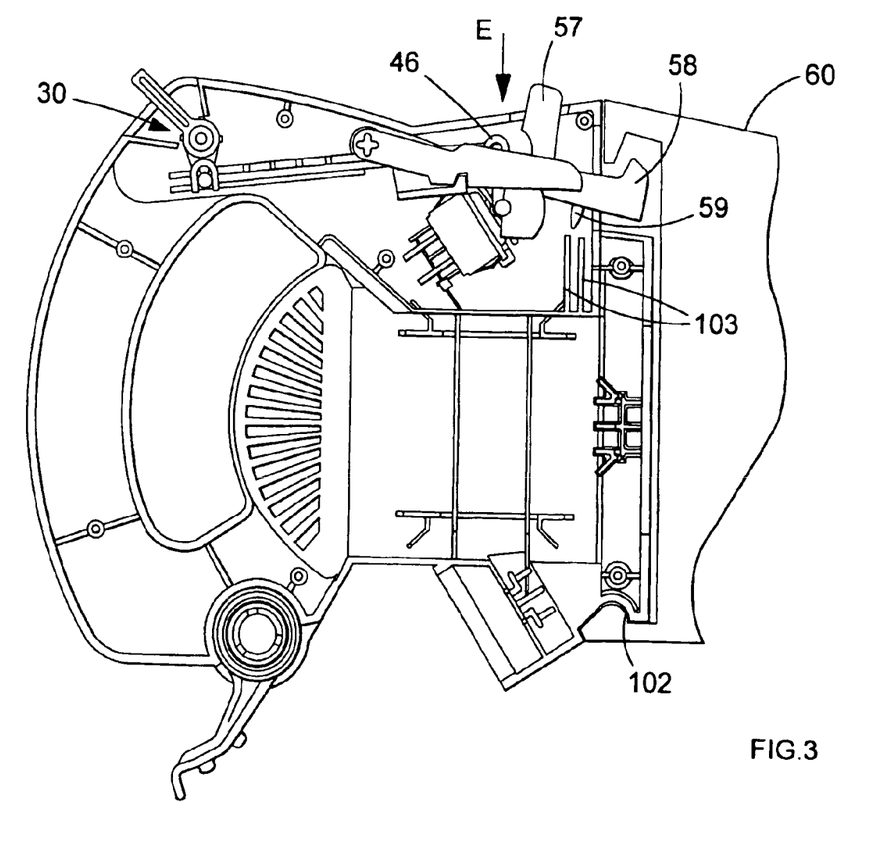
FIG. 3 is a side view of the same interlock mechanism in a third state of operation.

Turning now to FIG. 3, it will next be described how an attachment 60 can be engaged with motor housing 10. As may be seen from FIG. 3, the release button and latch component 50 of the interlock mechanism comprises both a release button 57 and a latch 58 in rigid connection with each other. Depression of release button 57 by a user in the direction indicated in FIG. 3 by arrow E causes component 50 to rotate in a direction opposite to that indicated in FIG. 2 by arrow C and acts against the biassing force provided by the previously mentioned compression spring, therefore compressing this spring further. However, abutment of a peg 59 formed on the underside of latch 58 with a pair of end stops 103 integrally moulded with motor casing 10 prevents a user from being able to squeeze the compression spring beyond its mechanical limit. (Note that in FIG. 3, arm 54 and protrusion 55 of component 50 have been omitted for the sake of increased clarity.) In an alternative embodiment, the previously mentioned compression spring engaged with protrusion 55 may be removed and replaced with a compression spring instead mounted over one of the end stops 103 and having one end engaged with peg 59. This alternative embodiment performs the same function as a compression spring engaged with protrusion 55 of biassing release button and latch component 50 in the direction indicated in FIG. 2 by arrow C.

Depressing release button 57 in the direction of arrow E also has the effect of reducing the distance between latch 58 and a lip 102 formed on the underside of motor housing 10. This allows an attachment 60 having a width similar to the separation between latch 58 and lip 102 when they are in the positions indicated in FIG. 2 to be hooked under lip 102 and slid over latch 58 until engaged therewith. At this point, releasing button 57 allows the compression spring in either embodiment to return component 50 to the position shown in FIG. 1, thereby engaging latch 58 with the attachment 60 and preventing removal of the attachment from motor housing 10 without a user firstly depressing release button 57 again.

As may be seen from FIG. 2 however, release button 57 may only be depressed when switch 30 is in the "off" position represented in FIG. 1. This is because in this position of switch 30, tooth 44 of slider 40 is aligned with notch 52 of component 50 and may engage therewith in the manner shown in FIG. 3 when release button 57 is depressed. Otherwise, edge 53 of component 50 abuts against tooth 44 as shown in FIG. 2, and release button 57 cannot be depressed. This ensures that a user may only remove an attachment from the motor housing and expose the fan by firstly switching switch 30 to its central "off" position, which also has the effect of turning the motor off when an attachment is engaged with motor housing 10 for reasons that will be explained shortly in relation to FIGS. 4 and 5. On the other hand, the engagement of tooth 44 with notch 52 ensures that switch 30 is held in the "off" position until such time as the attachment has been removed from motor housing 10 and the motor can consequently no longer be activated.

Figure 4:
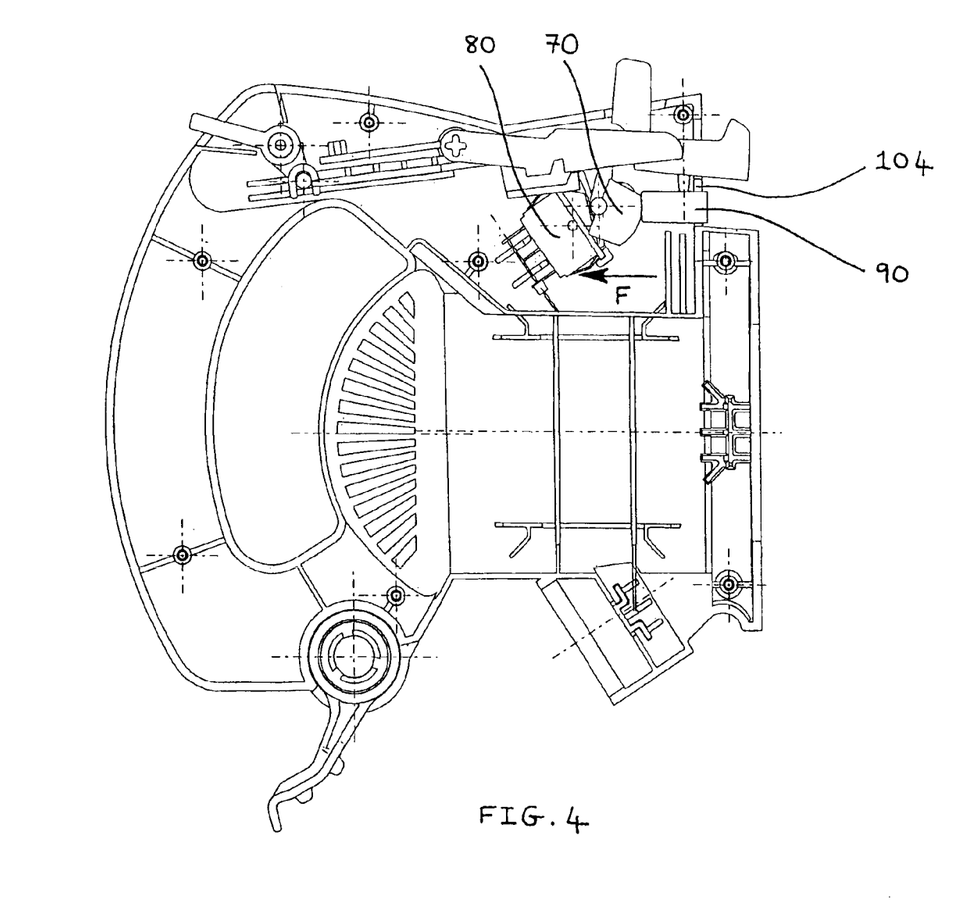
FIG. 4 is a side view of the same interlock mechanism in a fourth state of operation.

Referring next to FIG. 4, there is shown what happens when an attachment is engaged with motor housing 10. Motor housing 10 is provided with an orifice 104 through which a portion 90 of the attachment is able to penetrate into motor housing 10 until it abuts against actuator 70. This causes actuator 70, including axis 76 thereof, to undergo a translational movement in the direction indicated in FIG. 4 by arrow F. When actuator 70 makes this movement, axis 76 slides in a channel 105 formed integrally with motor housing 10 and which is most readily visible in FIG. 2. Thus when lever 32 of switch 30 is rotated by a user to the "on" position thereof shown in FIG. 4, the same sequence of events as previously described above in relation to FIG. 2 takes place, with the difference that actuator 70 has now been moved close enough to relay switch 80 in order to operate it. Actuator 70 is provided with a pusher plate 74 which presses against relay switch 80, moving it from the power-off position shown in FIG. 2 into the power-on position thereof shown in FIG. 4 (compare and contrast the position of relay switch 80 shown in FIG. 4 with its position shown in FIG. 2). This in turn causes either low-speed or high-speed operation of the motor according to how relay switch 80 has been wired up to the motor. The same state of operation shown in FIG. 4 is also shown in greater detail in the cross-sectional view of FIG. 6.

Figure 5:
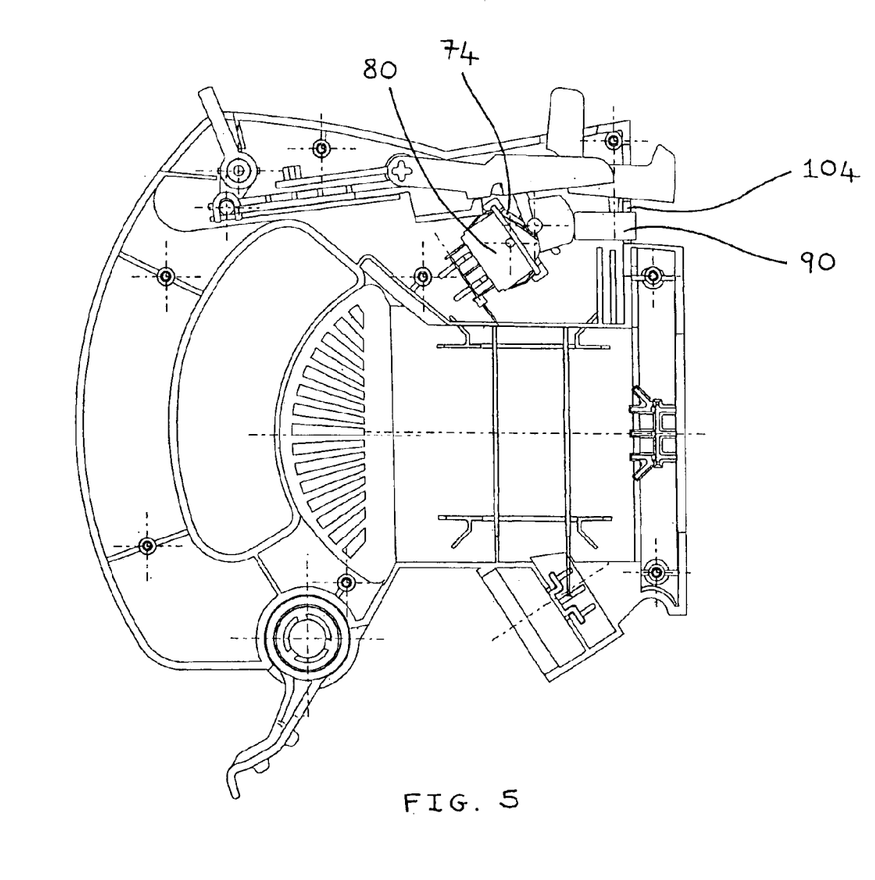
FIG. 5 is a side view of the same interlock mechanism in a fifth state of operation.

Now turning to FIG. 5, there is shown what happens when an attachment is engaged with motor housing 10, but lever 32 of switch 30 is instead rotated by a user in the opposite direction to that shown in FIG. 4 into the alternative "on" position thereof. In this case, slider 40 slides in channel 101 in the opposite direction to that shown in FIG. 4 and actuator 70 is consequently caused to rotate by hook 46 of slider 40 about axis 76 in a direction opposite to that indicated in FIG. 2 by arrow D. Once again, as in the state of operation shown in FIG. 4, the presence of a portion 90 of the attachment within motor housing 10 and in contact with actuator 70 causes actuator 70, including axis 76 thereof, to have moved in the direction indicated in FIG. 4 by arrow F, thereby bringing it into contact with relay switch 80. In the state of operation shown in FIG. 5, pusher plate 74 of actuator 70 presses against relay switch 80 in the opposite direction to that indicated by arrow D in FIG. 2, causing the relay switch to move from the power-off position shown in FIG. 2 into the power-on position shown in FIG. 5 (compare and contrast the position of relay switch 80 shown in FIG. 5 with that shown in both FIGS. 2 and 4). In this position of relay switch 80, the motor runs at the other one of the low-speed and high-speed rates of operation from that induced by the state of the interlock mechanism shown in FIG. 4.

As will already be clear from the explanation given above in relation to FIG. 2, lever 32 must be returned by a user to the central "off" position shown in FIG. 1 before the attachment can be disengaged from motor housing 10. This is to ensure that tooth 44 of slider 40 is aligned with notch 52 of component 50, thus enabling release button 57 to be depressed. However, before the attachment is removed from the motor housing, this also causes actuator 70 to return relay switch 80 to the power-off position thereof shown in FIGS. 1 to 3 and the motor therefore ceases running. On the other hand, when release button 57 is depressed and the attachment is removed, actuator 70 moves in a direction opposite to that indicated by arrow F in FIG. 4 and relay switch 80 can therefore no longer be operated by a user rotating lever 32 to either of the two alternative "on" positions thereof shown in FIGS. 4 and 5. Thus the motor remains off once the attachment has been removed.

FIGS. 7, 8, 9 and 10 show the various components of the interlock mechanism in greater detail, wherein the same reference numerals have been used to label the same features of these components as in FIGS. 1 to 6.

Finally, the following table (Table 1) gives a summary of the various different states of operation of the interlock mechanism.

TABLE 1

Figure 6:
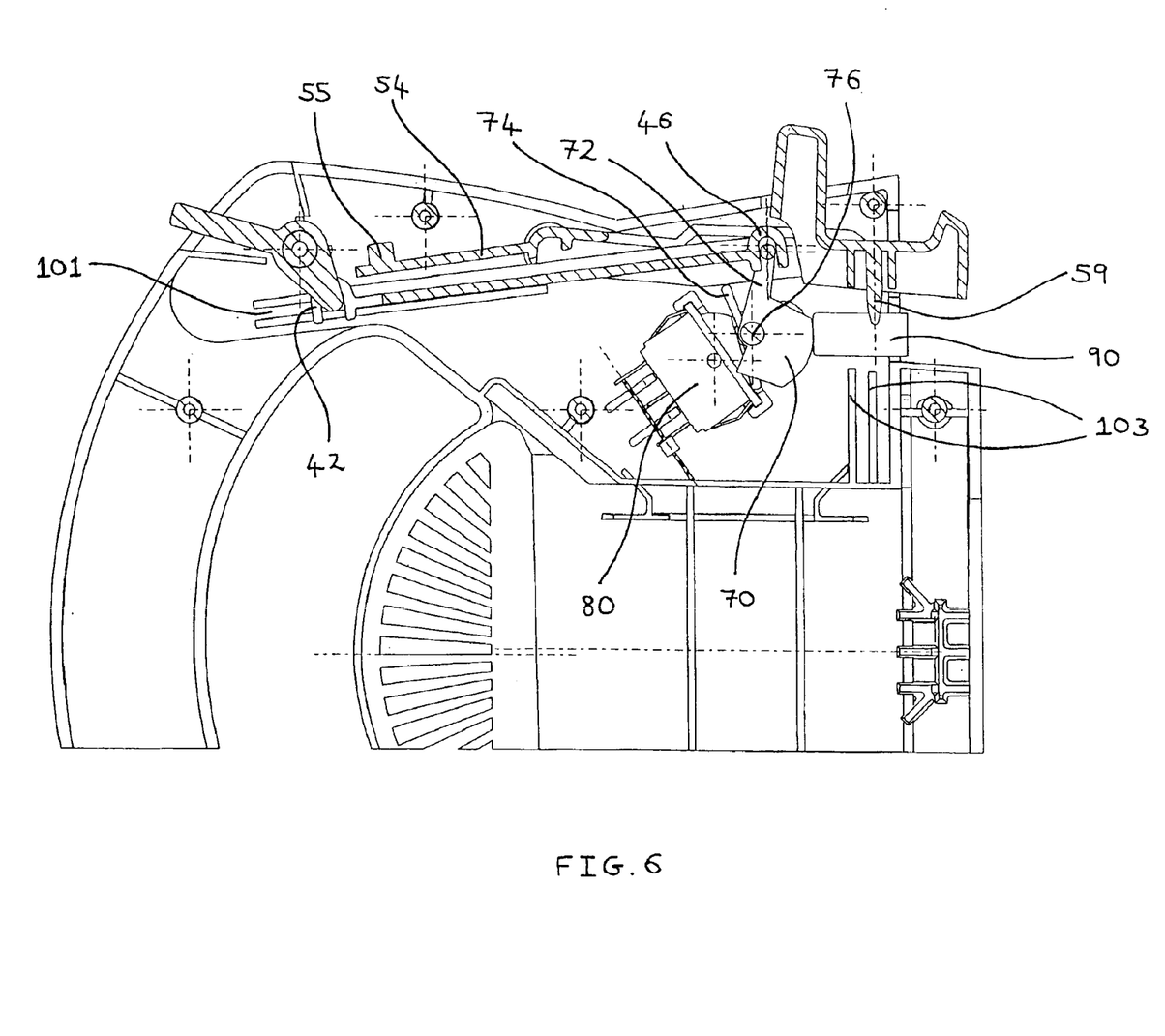
FIG. 6 is a more detailed cross-sectional view of the same interlock mechanism in the fourth state of operation depicted in FIG. 4.
Figure 7A:
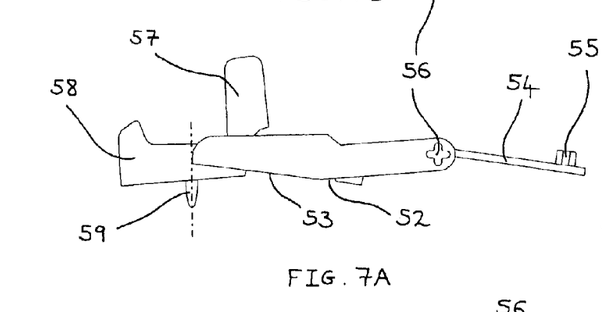
FIGS. 7A, 7B, 7C, 7D and 7E are respectively left-side elevational, top plan, bottom plan, front elevational and rear elevational views of a latch and release button component of the interlock mechanism shown in FIGS. 1 to 6.
Figure 7B:
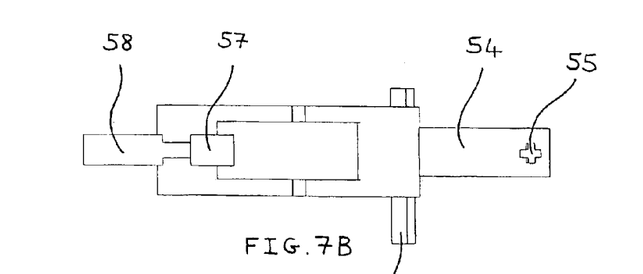
Figure 7C:
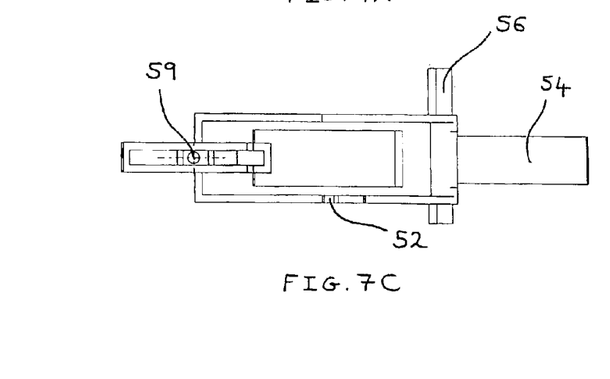
Figure 7D:
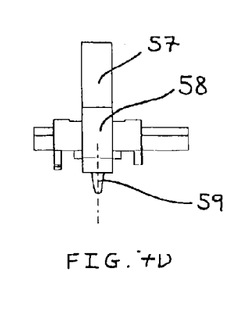
Figure 7E:
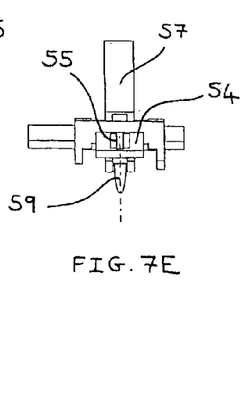

| Position of switch 30 | Tooth 44 aligned with notch 52? | Release button 57 depressed? | Attachment engaged? | State of motor | Shown in: |
|---|---|---|---|---|---|
| Off | Yes | No | No | Off | FIG. 1 |
| Speed 1 | No | Impossible | No | Off | FIG. 2 |
| Speed 2 | No | Impossible | No | Off | — |
| Off | Yes | Yes | No | Off | FIG. 3 |
| Speed 1 | No | Impossible | Yes | On speed 1 | FIGS. 4 & 6 |
| Speed 2 | No | Impossible | Yes | On speed 2 | FIG. 5 |

As may be seen from Table 1, the position of switch 30 determines whether tooth 44 of slider 40 is aligned with notch 52 of component 50. This in turn determines whether it is possible for a user to depress release button 57. Accordingly, an attachment may only be engaged with or removed from motor housing 10 when switch 30 is in the "off" position. On the other hand, actuator 70 is only close enough to relay switch 80 to operate the relay switch when an attachment is engaged with the motor housing. This ensures that actuator 70 is only able to switch the motor on when switch 30 is in the "speed 1" or "speed 2" position and an attachment is engaged.

The interlock mechanism described above in relation to the accompanying drawings is particularly appropriate for use with a blowervac of the type described in co-pending British patent application no. GB0229517.8 filed on 19 Dec. 2002. However, it is also suitable for use with any type of blowervac in which the fan is exposed to a user by removal of an attachment which would otherwise prevent a user from gaining access to the fan. Typically the attachment comprises a volute, as in the case of the blowervac described in European Patent No. 0 723 758. However, the interlock mechanism described above could equally well be applied to a blowervac in which a volute is permanently attached to the motor housing, but access to the fan is instead provided to a user via the air inlet to the volute. In such a case, the removable attachment would be a grille or a detachable suction tube designed to cover the volute's air inlet during operation of the blowervac and the interlock mechanism would co-operate with a portion of the grille and/or of the suction tube.

Moreover, although the interlock mechanism has been described above in relation to a blowervac having an electrically powered motor, it could equally well be applied to a blowervac having a petrol powered motor. In such a case, relay switch 80 could be replaced, for example, with a fuel-line cut-off and throttle mechanism of a conventional type.

What is claimed is:

1. An interlock mechanism suitable for use with a blower-vacuum device, comprising:
    a user-operable switch (30) having a first condition for activating a motor of said blower-vacuum device and a second condition for deactivating said motor;
    a latch (58) for engagement with a removable attachment of said blower-vacuum device; and
    a user-operable release button (57) for disengaging said removable attachment from said latch (58);
    wherein said switch (30) is operable to activate said motor only when said removable attachment is engaged with said latch (58), and said release button (57) is operable to disengage said removable attachment from said latch (58) only when said motor is deactivated;
    characterized in that:
    said first condition of said switch (30) comprises a first position of said switch for activating said motor at a first speed of operation and a second position of said switch for activating said motor at a second speed of operation.

2. An interlock mechanism according to claim 1, further comprising an actuator (70) coupled to said switch (30) for activating said motor, and wherein said actuator (70) is put in a first configuration operable to activate said motor by a portion (90) of said removable attachment when said removable attachment is engaged with said latch (58), and adopts a second configuration inoperable to activate said motor otherwise.

3. An interlock mechanism according to claim 2, wherein said actuator (70) is coupled to said switch (30) via a slider (40), and wherein said slider (40) is operable to convert a rotational motion of said switch (30) into a translational motion of said slider (40) and thence into a rotational motion of said actuator (70).

4. An interlock mechanism according to claim 3, wherein the slider (40) is operable to convert a rotational motion of said switch (30) in a first direction into a rotational motion of said actuator (70) in a second direction (D) opposite to said first direction.

5. An interlock mechanism according to claim 3 or claim 4, wherein the slider (40) comprises means (44) adapted to engage with a part (52) of said release button (57), and wherein when said switch (30) is in the first condition thereof, said means (44) occupies a first position obstructing movement of said release button (57) and when said switch (30) is in the second condition thereof, said means (44) occupies a second position allowing movement of said release button (57).

6. An interlock mechanism according to claim 5, wherein said means (44) is adapted to engage with said part (52) of said release button (57) when said switch (30) is in the second condition thereof, and wherein engagement of said means (44) with said part (52) in the second condition of said switch renders said switch inoperable to the first condition thereof.

7. An interlock mechanism according to claim 6, wherein said means (44) of said slider (40) is a tooth formed on said slider and said part (52) of said release button (57) is a notch for receiving said tooth therein.

8. An interlock mechanism according to claim 6, wherein said release button (57) is biased towards a position in which said part (52) thereof is disengaged from said means (44).

9. An interlock mechanism according to claim 8, further comprising a spring for biasing said release button (57) towards a position in which said part (52) thereof is disengaged from said means (44).

10. An interlock mechanism according to claim 1, wherein said release button (57) and said latch (58) are in rigid connection with each other.

11. An interlock mechanism according to claim 2, wherein said motor is electrically powered and said actuator (70) is adapted to operate a relay switch (80) in electrical connection with said motor.

12. An interlock mechanism according to claim 11, wherein said actuator (70) comprises a pusher plate (74) for operating said relay switch (80).

13. An interlock mechanism according to claim 2, wherein said motor is petrol powered and said actuator (70) is adapted to operate a fuel-line cut-off and throttle mechanism in fluid communication with said motor.

14. An interlock mechanism according to claim 1, wherein said blower-vacuum device further comprises a motor housing (10).

15. An interlock mechanism according to claim 1, wherein said removable attachment further comprises a volute.

* * * * *